US010307899B2

(12) United States Patent
Hu

(10) Patent No.: US 10,307,899 B2
(45) Date of Patent: Jun. 4, 2019

(54) TORSION CONTROL DEVICE AND METHOD FOR ELECTRIC IMPACT POWER TOOL

(71) Applicant: APEX MFG. CO., LTD., Taichung (TW)

(72) Inventor: Chih-Wei Hu, Taichung (TW)

(73) Assignee: APEX MFG. CO., LTD., Taichung (TW)

( * ) Notice: Subject to any disclaimer, the term of this patent is extended or adjusted under 35 U.S.C. 154(b) by 369 days.

(21) Appl. No.: 15/236,903

(22) Filed: Aug. 15, 2016

(65) Prior Publication Data

US 2017/0129080 A1 May 11, 2017

(30) Foreign Application Priority Data

Nov. 10, 2015 (TW) ............................ 104136986 A

(51) Int. Cl.
*H02P 25/10* (2006.01)
*B25B 21/02* (2006.01)
*B25B 23/147* (2006.01)
*H02P 25/14* (2006.01)

(52) U.S. Cl.
CPC .......... *B25B 23/1475* (2013.01); *B25B 21/02* (2013.01)

(58) Field of Classification Search
USPC ............ 318/139, 400.09, 432, 504; 388/937
See application file for complete search history.

(56) References Cited

U.S. PATENT DOCUMENTS 9,013,130 B2 * 4/2015 Chen ...................... H02P 31/00 318/432
2017/0008156 A1 * 1/2017 Miyazaki ............ B25B 23/1475
2017/0246732 A1 * 8/2017 Dey, IV .................. B25B 21/02

FOREIGN PATENT DOCUMENTS

TW I480132 4/2015

* cited by examiner

*Primary Examiner* — Bentsu Ro
(74) *Attorney, Agent, or Firm* — Muncy, Geissler, Olds & Lowe, P.C.

(57) ABSTRACT

Torsion control device and method for an electric impact power tool are provided. The electric impact power tool includes a motor, and the torsion control device detects an actual rotational speed of the motor to make the electric impact power tool output a preset torsion value accurately. In the torsion control method, a compensating time is calculated according to a difference between the actual rotational speed value of the motor and a preset rotational speed value.

8 Claims, 3 Drawing Sheets

| | Impacting mode | |
|---|---|---|
| Torsion level value | Prset rotational speed value | Impacting time value |
| 1 | $R_{01}$ | $T_1$ |
| 2 | $R_{02}$ | $T_2$ |
| 3 | $R_{03}$ | $T_3$ |
| ⋮ | ⋮ | ⋮ |
| n | $R_{0n}$ | $T_n$ |

FIG. 2

| | Compensating mode | |
|---|---|---|
| Torsion level value | Preset rotational speed difference | Compensating time value |
| 1 | $D_{11}$ | $t_{11}$ |
| | $D_{12}$ | $t_{12}$ |
| | $D_{13}$ | $t_{13}$ |
| | ⋮ | ⋮ |
| 2 | $D_{21}$ | $t_{21}$ |
| | $D_{22}$ | $t_{22}$ |
| | $D_{23}$ | $t_{23}$ |
| | ⋮ | ⋮ |
| ⋮ | ⋮ | ⋮ |
| n | $D_{n1}$ | $t_{n1}$ |
| | $D_{n2}$ | $t_{n2}$ |
| | $D_{n3}$ | $t_{n3}$ |
| | ⋮ | ⋮ |

FIG. 3

TORSION CONTROL DEVICE AND METHOD FOR ELECTRIC IMPACT POWER TOOL

BACKGROUND OF THE INVENTION

Field of the Invention

The present invention relates to an electric impact power tool.

Description of the Prior Art

An electric impact power tool is one of the common tools in the industry, this type of tool mainly drives an impacting device through a shaft of a motor and knocks a rotation axle through the impacting device to force the rotation axle to rotate to produce a torsion so that a user can use the electric impact power tool to screw or unscrew an engaging member (for example, a bolt or a nut). Therefore, how to control a total output torsion to assemble/disassemble members more accurately is an objective that the industry needs to work toward. This type of torsion control device and method for an electric impact power tool are disclosed in TWI480132.

It is understandable that a rotational speed and a rotation time of the motor affect a total output torsion of the rotation axle, and the rotational speed of the motor is controlled by a voltage value of a battery; therefore, in TWI480132, the torsion control device for an electric impact power tool continues to detect the voltage value output by the battery to build a time compensating mechanism correspondingly according to a variation of the voltage value.

However, the prior art neglects many important factors affecting the rotational speed of the motor when the electric impact power tool is operating. For example, the battery outputs the same voltage, and in actual practice, each said motor still cannot reach the same rotational speed because the motors have different rotational speed tolerances (slip rates); however, because the voltage value output by the battery is the same, the time compensating mechanism will not compensate. In other words, only taking the voltage value of the battery as a judgment reference is not reliable; and in actual practice, the total torsion value output cannot be accurately controlled, and a reliability or safety of an assembling/disassembling operation cannot be ensured.

The present invention has arisen to mitigate and/or obviate the afore-described disadvantages.

SUMMARY OF THE INVENTION

The major object of the present invention is to provide torsion control device and method for an electric impact power tool which take factors which affect a total output torsion into consideration and can accurately control a total torsion value output by the electric impact power tool and can reach a preset total torsion value through a time compensating mechanism after a voltage of a battery decreases.

To achieve the above and other objects, a torsion control device for an electric impact power tool is provided, the torsion control device for an electric impact power tool is for being electrically connected to a motor and a battery of an electric impact power tool, and the battery has a preset voltage. The torsion control device includes a switch, a low-voltage circuit, a motor-driven circuit, a torsion level selection circuit, a current detecting circuit, a motor rotational speed detecting circuit and a controlling circuit. The switch is for being electrically connected to the battery. The low-voltage circuit is electrically connected to the switch, and when the switch is on, the low-voltage circuit is for transferring the preset voltage of the battery into a low voltage which is lower than the preset voltage. The motor-driven circuit is for being electrically connected to the motor and for driving the motor to rotate. The torsion level selection circuit has an input device for switching, the input device has a plurality of torsion level options, and the torsion level selection circuit outputs an option signal corresponding to one of said torsion level options. The current detecting circuit is for being electrically connected to the motor, the current detecting circuit is for detecting an actual current value of the motor and transfers the actual current value of the motor into a voltage signal to be output. The motor rotational speed detecting circuit is for detecting an actual rotational speed of the motor in a non-contact manner and outputting an actual rotational speed signal corresponding to the actual rotational speed of the motor. The controlling circuit is electrically connected to the low-voltage circuit, the motor-driven circuit, the torsion level selection circuit, the current detecting circuit and the motor rotational speed detecting circuit, the low voltage is for providing a power needed when the controlling circuit operates, the controlling circuit receives the voltage signal and the actual rotational speed signal and transfers the voltage signal and the actual rotational speed signal into a first voltage value and an actual rotational speed value respectively, the controlling circuit includes a saving unit and a timer, the saving unit has a second voltage value, a plurality of torsion level values, a plurality of impacting modes and a plurality of compensating modes, the plurality of impacting modes respectively correspond to the plurality of torsion level values, each said impacting mode has a preset rotational speed value and an impacting time value which correspond to each other, the plurality of compensating modes respectively correspond to the plurality of torsion level values, each said compensating mode has a plurality of preset rotational speed differences and a plurality of compensating time values which correspond to each other, and as the controlling circuit receives the option signal, the controlling circuit matches the option signal with corresponding one of said torsion level values and obtains corresponding one of said impacting modes and corresponding one of said compensating modes. When the actual rotational speed value reaches the preset rotational speed value and when the first voltage value is equal to or greater than the second voltage value, the timer starts to count; and when the timer counts to the impacting time value, the motor stops operating. When the actual rotational speed value is lower than the preset rotational speed value and when the first voltage value is equal to or greater than the second voltage value, the timer starts to count; and when the timer counts to a total time value, the motor stops operating, and the total time value is a sum of the impacting time value and the compensating time value.

To achieve the above and other objects, a torsion control method for an electric impact power tool is provided. The torsion control method is for being used in an electric impact power tool, the electric impact power tool has a motor, a battery and a plurality of torsion level options. Firstly, a second voltage value is preset; an impacting mode and a compensating mode are respectively built corresponding to each said torsion level option, each said impacting mode has a preset rotational speed value and an impacting time value; each said compensating mode has a plurality of preset rotational speed differences and a plurality of compensating time values; the torsion control method includes following steps of: selecting one said torsion level option, actuating the motor to rotate, detecting continuously and obtaining an actual rotational speed value and an actual current value of the motor, and transferring the actual rotational speed value of the motor into a first voltage value.

In the plurality of impacting modes and the plurality of compensating modes, the torsion control device can obtain one of said preset rotational speed values, one of said impacting time values, the plurality of preset rotational speed differences and the plurality of compensating time values corresponding to one of said torsion level options which is chosen, and the torsion control device can determine to execute one of following: first, when the actual rotational speed value of the motor reaches the preset rotational speed value and when the first voltage value is equal to or greater than the second voltage value, the timer starts to count, and as a time reaches the impacting time value, the motor stops operating; and second, when the actual rotational speed value is lower than the preset rotational speed value, an actual rotational speed difference is calculated and corresponds to one of said preset rotational speed differences, and the actual rotational speed difference is a difference between the actual rotational speed value and the preset rotational speed value; and when the first voltage value is equal to or greater than the second voltage value, the timer starts to count, and as the time reaches a total time value, the motor stops operating, and the total time value is a sum of the impacting time value and the compensating time value.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2 is a drawing showing an impacting mode of the preferred embodiment of the present invention;

FIG. 3 is a drawing showing a compensating mode of the preferred embodiment of the present invention.

DETAILED DESCRIPTION OF THE PREFERRED EMBODIMENTS

The present invention will be clearer from the following description when viewed together with the accompanying drawings, which show, for purpose of illustrations only the preferred embodiment in accordance with the present invention.

Figure 1:
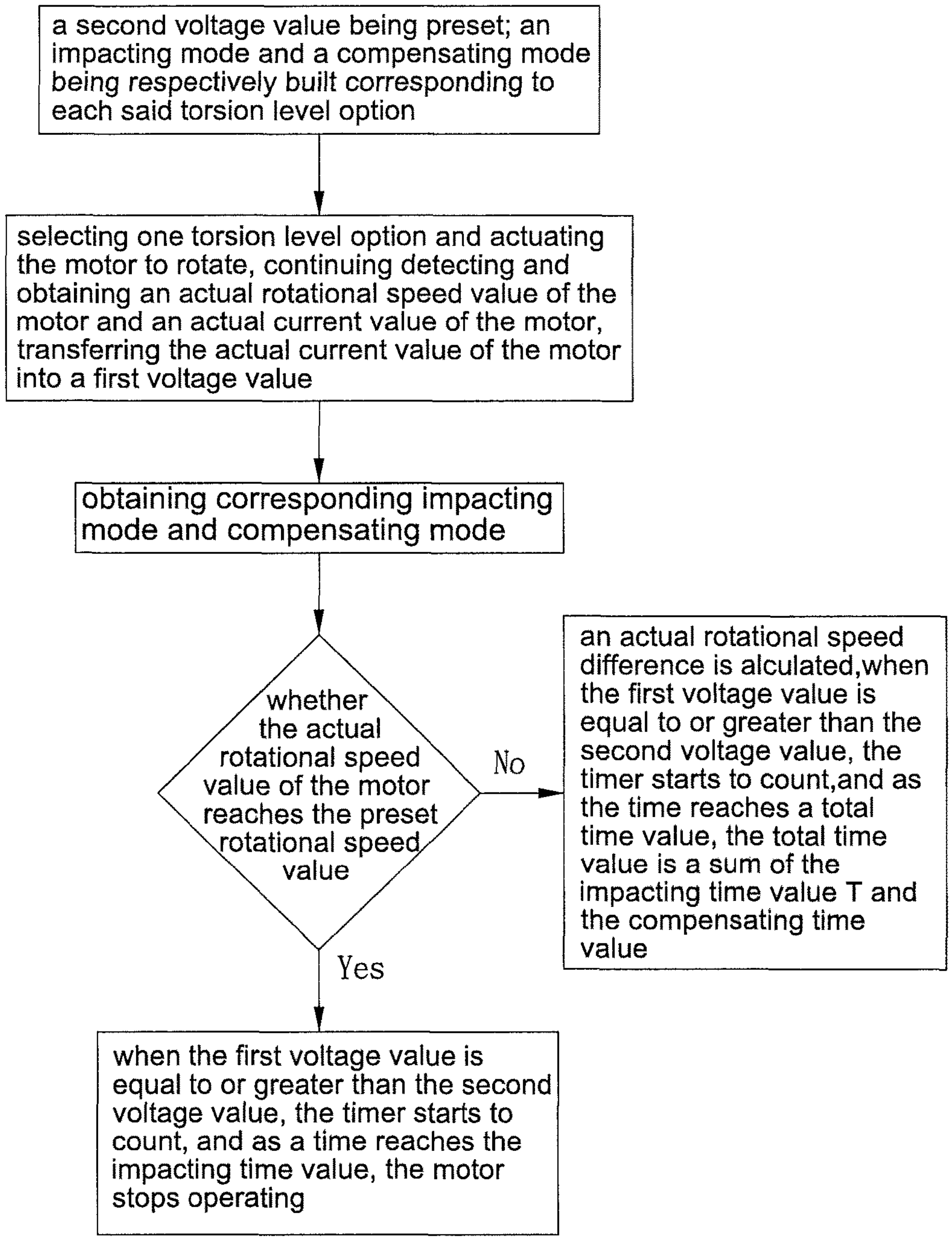
FIG. 1 is a flow chart showing a determination process of a preferred embodiment of the present invention.
Figure 4:
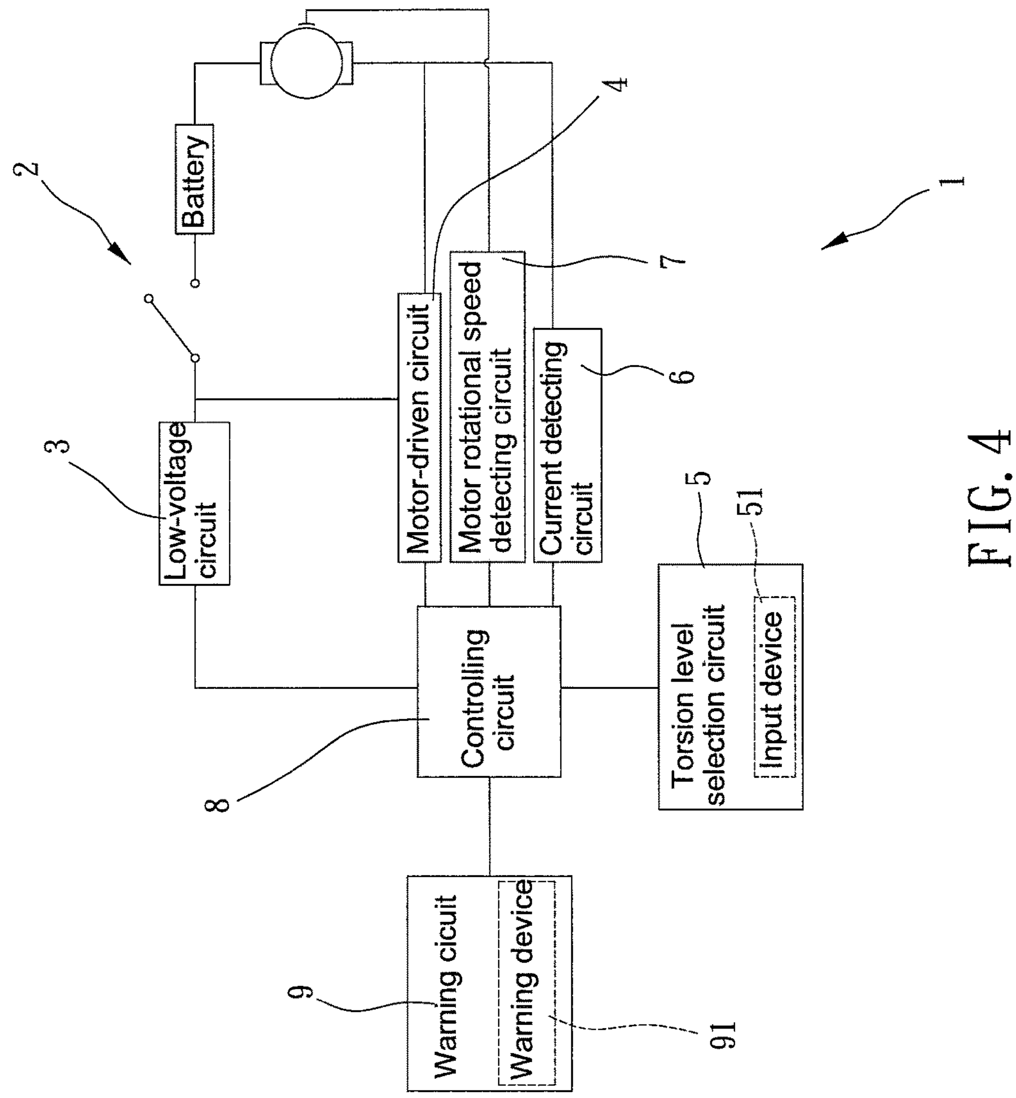
FIG. 4 is a drawing showing a relationship of members of the preferred embodiment of the present invention.

Please refer to FIGS. 1 to 4 for a preferred embodiment of the present invention. A torsion control device 1 for an electric impact power tool is provided. The torsion control device 1 is electrically connected to a motor and a battery of an electric impact power tool, the battery has a preset voltage, the torsion control device 1 includes a switch 2, a low-voltage circuit 3, a motor-driven circuit 4, a torsion level selection circuit 5, a current detecting circuit 6, a motor rotational speed detecting circuit 7 and a controlling circuit 8.

The switch 2 is for being electrically connected to the battery. The low-voltage circuit 3 is electrically connected to the switch 2, and when the switch 2 is on, the low-voltage circuit 3 is for transferring the preset voltage of the battery into a low voltage which is lower than the preset voltage. The motor-driven circuit 4 is for being electrically connected to the motor and for driving the motor to rotate. The torsion level selection circuit 5 has an input device 51 for switching, the input device 51 has a plurality of torsion level options, and the torsion level selection circuit 5 outputs an option signal corresponding to one of said torsion level options. The current detecting circuit 6 is for being electrically connected to the motor, and the current detecting circuit 6 is for detecting an actual current value of the motor and transferring the actual current value of the motor into a voltage signal to be output.

It is to be noted that a total torsion magnitude of the electric impact power tool is associated with a rotational speed of the motor and a voltage of the battery; however, in actual practice, there are many factors which affect an output torsion, for example, a rotation tolerance of the motor, battery depletion, and other factors. Therefore, if only taking a voltage value of the battery as a judgment reference, compensation to a total output torsion is not precise and not reliable. It is understandable that no matter what factors affecting the total output torsion, the actual rotational speed of the motor will eventually be changed. In other words, to accurately compensate the total output torsion, a preferable way is to accurately control the actual rotational speed of the motor. There are many ways to detect the actual rotational speed of the motor; and more specifically, to avoid the actual rotational speed of the motor from being influenced during a detecting process, the motor rotational speed detecting circuit 7 of this embodiment detects the actual rotational speed of the motor in a non-contact manner, and the motor rotational speed detecting circuit 7 outputs an actual rotational speed signal corresponding to the actual rotational speed of the motor. More specifically, the motor rotational speed detecting circuit 7 has a detecting device for detecting the actual rotational speed of the motor, and the detecting device is an optical device or a magnetism-sensing device.

The controlling circuit 8 is a determination unit of the torsion control device 1, the controlling circuit 8 is electrically connected to the low-voltage circuit 3, the motor-driven circuit 4, the torsion level selection circuit 5, the current detecting circuit 6 and the motor rotational speed detecting circuit 7, the low voltage is for providing a power needed when the controlling circuit 8 operates, the controlling circuit 8 receives the voltage signal and the actual rotational speed signal and transfers the voltage signal and the actual rotational speed signal into a first voltage value and an actual rotational speed value respectively, the controlling circuit 8 includes a saving unit and a timer, the saving unit has a second voltage value, a plurality of torsion level values, a plurality of impacting modes (as shown in FIG. 2) and a plurality of compensating modes (as shown in FIG. 3), the plurality of impacting modes respectively correspond to the plurality of torsion level values, each said impacting mode has a preset rotational speed value R and an impacting time value T which correspond to each other, the plurality of compensating modes respectively correspond to the plurality of torsion level values, each said compensating mode has a plurality of preset rotational speed differences D and a plurality of compensating time values t which correspond to each other, as the controlling circuit 8 receives the option signal, the controlling circuit 8 matches the option signal with corresponding one of said torsion level values and obtains corresponding one of said impacting modes and corresponding one of said compensating modes.

When the actual rotational speed value reaches the preset rotational speed value R and when the first voltage value is equal to or greater than the second voltage value, the timer starts to count; and when the timer counts to the impacting time value T, the motor stops operating. On the contrary, when the actual rotational speed value is lower than the preset rotational speed value R, a compensating mechanism starts; and when the first voltage value is equal to or greater than the second voltage value, the timer starts to count; and when the timer counts to a total time value, the motor stops operating, and the total time value is a sum of the impacting time value T and the compensating time value t. In other words, the compensating mechanism, through prolonging an impacting time, makes the actual total torsion value of the torsion control device 1 reach the preset total torsion value so that an assembling/disassembling operation can be accurately conducted and that the safety of a machine assembled can be elevated.

Preferably, the torsion control device 1 further includes a warning circuit 9 which is electrically connected to the controlling circuit 8, the warning circuit 9 has a warning device 91 (for example, a buzzer, a LED or a display screen), a difference between the actual rotational speed value and the preset rotational speed value R is defined as an actual rotational speed difference, when the actual rotational speed difference is greater than a maximum one of the plurality of preset rotational speed differences, the controlling circuit 8 outputs a stopping signal to the motor-driven circuit 4 so as to stop the motor from operating, the controlling circuit 8 outputs a driving signal to the warning circuit 9, and the warning circuit 9 drives the warning device 91 to send a warning information.

A torsion control method for an electric impact power tool is further provided for being used in the electric impact power tool mentioned above. The electric impact power tool has the motor, the battery and the plurality of torsion level options. Firstly, a second voltage value is preset; then one said impacting mode and one said compensating mode are respectively built corresponding to each said torsion level option, each said impacting mode has one said preset rotational speed value R and one said impacting time value T; and each said compensating mode has the plurality of preset rotational speed differences D and the plurality of compensating time values t. The torsion control method includes following steps.

Firstly, select one of said torsion level options and actuate the motor to rotate, continue detecting and obtaining an actual rotational speed value of the motor and an actual current value of the motor, and transfer the actual current value of the motor into a first voltage value.

Secondly, in the plurality of impacting modes and the plurality of compensating modes, obtain one of said preset rotational speed values R, one of said impacting time values T, the plurality of preset rotational speed differences D and the plurality of compensating time values t corresponding to one of said torsion level options which is chosen, and determine to execute one of following. First, when the actual rotational speed value of the motor reaches the preset rotational speed value R and when the first voltage value is equal to or greater than the second voltage value, the timer starts to count, and as a time reaches the impacting time value, the motor stops operating. Second, when the actual rotational speed value is lower than the preset rotational speed value R, an actual rotational speed difference is calculated and corresponds to one of said preset rotational speed differences D, the actual rotational speed difference is a difference between the actual rotational speed value and the preset rotational speed value R; and when the first voltage value is equal to or greater than the second voltage value, the timer starts to count, and as the time reaches a total time value, the motor stops operating, and the total time value is a sum of the impacting time value T and the compensating time value t.

For example, when the torsion level value is 2, the preset rotational speed value R corresponding to the impacting mode is $R_{02}$, and the impacting time value T is $T_2$. Similarly, when in the compensating mode, the preset rotational speed difference D and the compensating time value t are located from a position corresponding to the torsion level value which is 2. On the assumption that the preset rotational speed difference D is $D_{22}$, the compensating time value t is $t_{22}$, and the total time value is $T_2+t_{22}$.

When the actual rotational speed value of the motor is lower than the preset rotational speed value R, the difference between the actual rotational speed value of the motor and the preset rotational speed value R is compensated through prolonging an impacting movement for a time (that is the compensating time value t) so as to reach the total torsion output of the original preset rotational speed value R. Specifically, the total torsion output is associated with a rotation turns of the motor, so in this embodiment, through the compensating time value t, the motor which has a slow rotational speed is compensated with the rotation turns in the compensating time so as to reach a same rotation turns as the motor operating in the preset rotational speed value R during the impacting time. More specifically, in this embodiment, each said compensating time value t is defined as (H)×(each said impacting time value T)×((each said preset rotational speed difference D)/(the actual rotational speed value of the motor)), and H is defined as a transferring constant and can be adjusted according to different requirements. For example, when the preset rotational speed value R is set as 1000 rpm and the impacting time is set as 10 s, so the rotation turns of the motor is 166.7 turns in total; and when the preset rotational speed difference D is 400 rpm; that is, the actual rotational speed value is 600 rpm, and the compensating time value t is 6.67 s. Therefore, the motor which has the low rotational speed stops rotating after rotating for 16.67 s, and the rotation turns of the motor is 166.7 turns. It is to be noted that a user can design different formula to define the plurality of compensating time values t according to different requirements and considerations.

In addition, when the actual rotational speed difference of the motor is between a maximum one and a minimum one of the plurality of preset rotational speed differences D and unequal to any one of the preset rotational speed differences D, the compensating time value t corresponded is obtained based on the actual rotational speed difference of the motor which is smaller than and closest to the preset rotational speed difference D to prevent the motor from outputting too much total torsion and causing damage to a screw (or other fastening members). When the actual rotational speed difference is smaller than the minimum one of the plurality of preset rotational speed differences D, the compensating time value is zero because the difference is too small and can be ignored. When the actual rotational speed difference is greater than the maximum one of the plurality of preset rotational speed differences D, which means the voltage of the battery is too low or the motor is partly damaged; in other words, the torsion control device 1 cannot be adapted to an actual processing process, and the motor is set to stop operating in this state.

Given the above, the torsion control device and method for the electric impact power tool take the factors affecting the total torsion in the actual practice (for example, the rotational speed of the motor, the voltage of the battery, the tolerance of the rotational speed of the motor and electricity depletion) into consideration and find the most important factor: the actual rotational speed of the motor. In addition, the actual rotational speed value is obtained in the non-contact manner to prevent the operation of the motor from being influenced.

In addition, when there is the rotational speed difference, the motor in the rotational speed lower than the preset rotational speed can output the same total torsion as the motor in the preset rotational speed does through the compensating time so as to accurately conduct the assembling/disassembling operations. Furthermore, the warning circuit is provided, so when the rotational speed difference is too great, the user can be effectively warned.

While we have shown and described various embodiments in accordance with the present invention, it should be clear to those skilled in the art that further embodiments may be made without departing from the scope of the present invention.

What is claimed is:

1. A torsion control device for an electric impact power tool, for being electrically connected to a motor and a battery of an electric impact power tool, the battery having a preset voltage, the torsion control device including:

a switch, for being electrically connected to the battery;

a low-voltage circuit, electrically connected to the switch, when the switch is on, the low-voltage circuit is for transferring the preset voltage of the battery into a low voltage which is lower than the preset voltage;

a motor-driven circuit, for being electrically connected to the motor and for driving the motor to rotate;

a torsion level selection circuit, having an input device for switching, the input device having a plurality of torsion level options, the torsion level selection circuit outputting an option signal corresponding to one of said torsion level options;

a current detecting circuit, for being electrically connected to the motor, the current detecting circuit for detecting a current of the motor and transferring the current of the motor into a voltage signal to be output;

a motor rotational speed detecting circuit, for detecting an actual rotational speed of the motor in a non-contact manner and outputting an actual rotational speed signal corresponding to the actual rotational speed of the motor;

a controlling circuit, electrically connected to the low-voltage circuit, the motor-driven circuit, the torsion level selection circuit, the current detecting circuit and the motor rotational speed detecting circuit, the low voltage being for providing a power needed when the controlling circuit operates, the controlling circuit receiving the voltage signal and the actual rotational speed signal and transferring the voltage signal and the actual rotational speed signal into a first voltage value and an actual rotational speed value respectively, the controlling circuit including a saving unit and a timer, the saving unit having a second voltage value, a plurality of torsion level values, a plurality of impacting modes and a plurality of compensating modes, the plurality of impacting modes respectively corresponding to the plurality of torsion level values, each said impacting mode having a preset rotational speed value and an impacting time value which correspond to each other, the plurality of compensating modes respectively corresponding to the plurality of torsion level values, each said compensating mode having a plurality of preset rotational speed differences and a plurality of compensating time values which correspond to each other, as the controlling circuit receives the option signal, the controlling circuit matches the option signal with corresponding one of said torsion level values and obtains corresponding one of said impacting modes and corresponding one of said compensating modes;

wherein when the actual rotational speed value reaches the preset rotational speed value and when the first voltage value is equal to or greater than the second voltage value, the timer starts to count; and when the timer counts to the impacting time value, the motor stops operating;

wherein when the actual rotational speed value is lower than the preset rotational speed value and when the first voltage value is equal to or greater than the second voltage value, the timer starts to count; and when the timer counts to a total time value, the motor stops operating, wherein the total time value is a sum of the impacting time value and the compensating time value.

2. The torsion control device for an electric impact power tool of claim 1, wherein the motor rotational speed detecting circuit has a detecting device for detecting the actual rotational speed of the motor, and the detecting device is an optical device or a magnetism-sensing device.

3. The torsion control device for an electric impact power tool of claim 1, further including a warning circuit which is electrically connected to the controlling circuit, the warning circuit having a warning device, a difference between the actual rotational speed value and the preset rotational speed value being defined as an actual rotational speed difference, when the actual rotational speed difference is greater than a maximum one of the plurality of preset rotational speed differences, the controlling circuit outputs a stopping signal to the motor-driven circuit so as to stop the motor from operating, the controlling circuit outputs a driving signal to the warning circuit, and the warning circuit drives the warning device to send a warning information.

4. A torsion control method for an electric impact power tool, for being used in an electric impact power tool, the electric impact power tool having a motor, a battery and a plurality of torsion level options, firstly, a second voltage value being preset; an impacting mode and a compensating mode being respectively built corresponding to each said torsion level option, each said impacting mode having a preset rotational speed value and an impacting time value; each said compensating mode having a plurality of preset rotational speed differences and a plurality of compensating time values; the torsion control method including following steps of:

selecting one said torsion level option and actuating the motor to rotate, continuing detecting and obtaining an actual rotational speed value of the motor and an actual current value of the motor, transferring the actual current value of the motor into a first voltage value;

in the plurality of impacting modes and the plurality of compensating modes, obtaining one of said preset rotational speed values, one of said impacting time values, the plurality of preset rotational speed differences and the plurality of compensating time values corresponding to one of said torsion level options which is chosen, and determining to execute one of following:

when the actual rotational speed value of the motor reaches the preset rotational speed value and when the first voltage value is equal to or greater than the second voltage value, the timer starts to count, and as a time reaches the impacting time value, the motor stops operating;

when the actual rotational speed value is lower than the preset rotational speed value, an actual rotational speed difference is calculated and corresponds to one of said preset rotational speed differences, wherein the actual rotational speed difference is a difference between the actual rotational speed value and the preset rotational speed value; and when the first voltage value is equal to or greater than the second voltage value, the timer starts to count, and as the time reaches a total time value, the motor stops operating, wherein the total time value is a sum of the impacting time value and the compensating time value.

5. The torsion control method for an electric impact power tool of claim 4, wherein each said compensating time value is defined as (H)×(each said impacting time value)×((each said preset rotational speed difference)/(the actual rotational speed value of the motor)), wherein H is defined as a transferring constant.

6. The torsion control method for an electric impact power tool of claim 4, wherein the actual rotational speed difference of the motor is between a maximum one and a minimum one of the plurality of preset rotational speed differences and unequal to any one of the preset rotational speed differences, the compensating time value corresponded is obtained based on the actual rotational speed difference of the motor which is smaller than and closest to the preset rotational speed difference.

7. The torsion control method for an electric impact power tool of claim 4, wherein the actual rotational speed difference is smaller than a minimum one of the plurality of preset rotational speed differences, and the compensating time value is zero.

8. The torsion control method for an electric impact power tool of claim 4, wherein the actual rotational speed difference is greater than a maximum one of the plurality of preset rotational speed differences, and the motor stops operating.

* * * * *